(No Model.)

A. A. STROM.
RAIL BENDER.

No. 344,793. Patented June 29, 1886.

Witnesses:
Chas. E. Gaylord.
H. A. Pettibone.

Inventor:
Axel A. Strom
by R. H. Pettibone
Attorney.

United States Patent Office.

AXEL ALBIN STROM, OF CHICAGO, ILLINOIS.

RAIL-BENDER.

SPECIFICATION forming part of Letters Patent No. 344,793, dated June 29, 1886.

Application filed May 4, 1885. Serial No. 164,359. (No model.)

*To all whom it may concern:*

Be it known that I, AXEL ALBIN STROM, a citizen of the United States, residing at the city of Chicago, in the county of Cook and State of Illinois, have invented a certain new and useful Improvement in Rail-Benders, of which the following is a specification, reference being had to the accompanying drawings.

Figure 1:
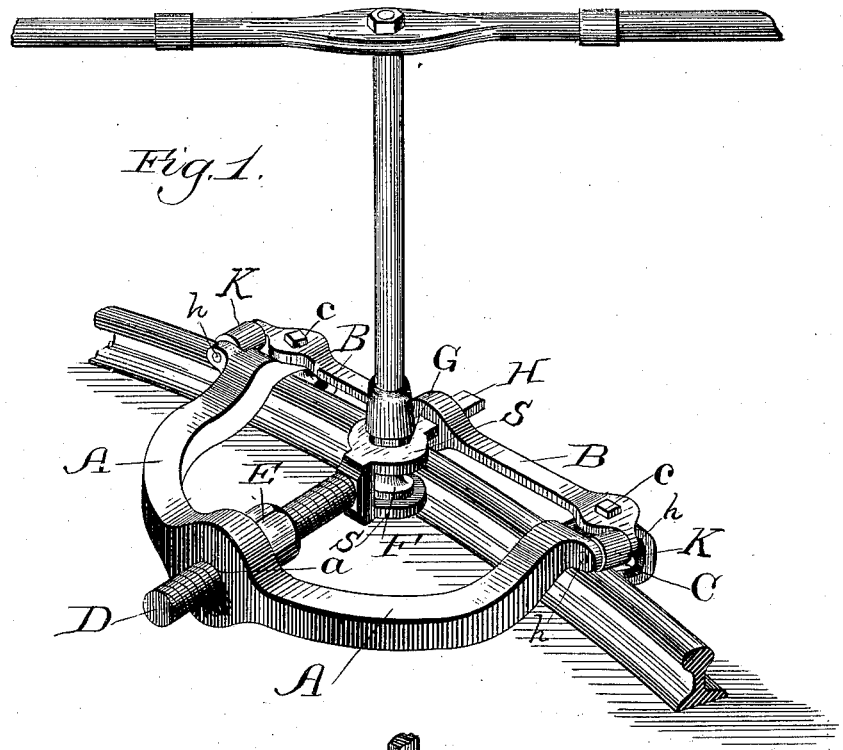
Figure 2:
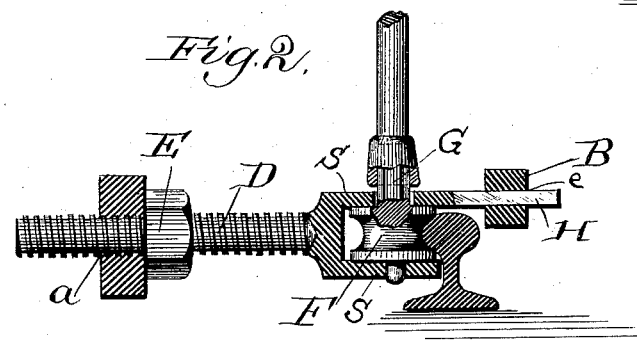
Figure 3:
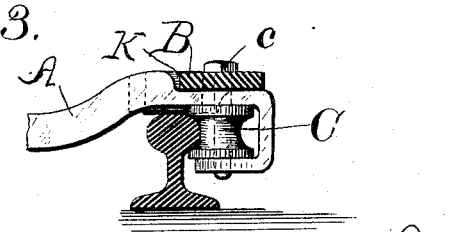

Figure 1 is a perspective view of the rail-bender. Figs. 2 and 3 are details.

Similar letters refer to similar parts throughout the several views.

A is the frame, to which is attached the cross-piece B. In the center of the frame A is the opening $a$. The ends of the frame are curved, as shown in Fig. 1, and have openings through which pass the studs or pins $c\ c$, which serve to fasten the cross-piece B to the frame A, and also as axles for the rollers C C. These rollers C C are made so as to fit the side of the head of a T-rail.

D is a screw, upon which turns the nut E. The end of the screw passes through the opening $a$.

F is a roller, made so as to fit the side of the head of a T-rail, and is keyed to the spindle G. The spindle G passes through openings in the enlarged and divided head S S of the screw D.

H is the guide-bar, playing in the opening $e$ in the center of the cross-piece B. The guide-bar may be marked with a gage.

K K are friction-rollers, turning in the hubs $h\ h$, attached to or a part of the frame A A.

When operated, the machine is placed in position, as shown in Fig. 1, and by means of a wrench fitting the nut E the nut is turned on the screw D until sufficient force is applied to the rail at its points of contact with the rollers C C and F to bend it into the desired curve. An ordinary socket-wrench with levers is then applied to the head of the spindle G, and upon turning the wrench, which causes the roller F to revolve, the machine moves along the rail upon the rollers. The rail is thus easily, rapidly, and uniformly bent into any desired curve. In the devices heretofore used for this purpose it has been difficult to secure a uniform curve, and the process has been slow and laborious, the rail-benders being applied to the rail at one point and the rail bent there, then to another, and so on, until the rail was curved as desired. By the use of my device an entire rail may be bent upon a uniform curve with ease and rapidity.

I am aware of a device for bending rails and bars, consisting in an arrangement whereby the bending is effected by causing the apparatus to travel along the article to be bent, and comprising a frame carrying rollers journaled in its ends and provided with guides, adjustable side bars passing through said guides, a roller journaled in the lower end of the side bars, a cross-head, a plate secured to the frame, and a screw, and actuated by a lever or other suitable or convenient means, and I hereby disclaim the same. The device referred to, however, is constructed with rollers fitting the web of the rail and cannot be applied to the head of the rail, while the rollers described and shown in this specification are made so as to fit the head, that being the heaviest part of the rail, and when the head of the rail is curved the web and base are bent with it; but in the use of a device operating upon the web, the head being heavier and the base larger laterally, the head and base are not uniformly bent with the web, and it would operate only upon rails of very light weight.

In using the device referred to, also, it is necessary to place the rail upon horses or supports, while my invention may be employed upon a rail lying on the ties or upon the ground.

The construction of the frame with bent extremities joined by a cross-bar, as described in this specification, is also a superior feature of my device, affording greater strength, and preventing the bending, spreading, or wabbling of the machine when in use.

What I claim as new, and desire to secure by Letters Patent of the United States, is as follows:

1. The combination of frame A and rollers C C and F, arranged at one side of the frame, to permit the application of the machine, as described.

2. The combination of frame A and rollers C C and F, arranged at one side of the frame, and the friction-rollers K K, as and for the purpose set forth.

3. The combination of frame A and rollers C C and F, arranged at one side of the frame, spindle G, and friction-rollers K K, as and for the purpose set forth.

4. The combination of frame A and rollers C C and F, arranged at one side of the frame, screw D and nut E, and friction-rollers K K, as and for the purpose set forth.

5. The combination of frame A and rollers C C and F, arranged at one side of the frame, screw D and nut E, spindle G, and friction-rollers K K, as and for the purpose set forth.

6. The combination of the frame A, screw D, nut E, rollers C C and F, and spindle G, with the guide-bar H, substantially as described.

7. A device for bending rails, comprising a frame, A, having its extremities bent and joined by a cross-bar, B, and provided with a central opening, a, in combination with a screw inserted at one end through the central opening in the frame, provided with a nut, E, for tightening it, and having a divided head, S S, connecting the screw with the cross-bar and affording bearings for a roller, F, to embrace the head of a rail at one side, rollers C C, in suitable bearings in the bent extremities of the frame A, to embrace the head of a rail at its opposite side, and means, substantially as described, for actuating the roller F, as set forth.

8. A device for bending rails, comprising a frame, A, having its extremities bent and joined by a cross-bar, B, and provided with a central opening, a, in combination with a screw inserted at one end through the central opening in the frame, provided with a nut, E, and having a divided head, S S, connecting the screw with the cross-bar and affording bearings for a roller, F, to embrace the head of a rail at one side, rollers C C, in suitable bearings in the bent extremities of the frame A, to embrace the head of a rail at its opposite side, friction-rollers K K, and means, substantially as described, for actuating the roller F, as set forth.

9. The combination of the frame A, cross-piece B, rollers C C, F, and K K, screw D, nut E, guide-bar H, and pins c c, with the spindle G, substantially as described.

AXEL ALBIN STRÖM.

Witnesses:
A. HENRY MULLIKEN,
THOMAS D. TODD.